United States Patent
McBride et al.

(10) Patent No.: US 10,595,430 B2
(45) Date of Patent: Mar. 17, 2020

(54) REGULATOR UNIT FOR DISTRIBUTED SENSOR SYSTEMS

(71) Applicant: Simmonds Precision Products, Inc., Vergennes, VT (US)

(72) Inventors: Benjamin D. McBride, South Burlington, VT (US); Travis Gang, Hinesburg, VT (US); Peter J. Carini, Underhill, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 437 days.

(21) Appl. No.: 15/602,780

(22) Filed: May 23, 2017

(65) Prior Publication Data

US 2018/0343761 A1 Nov. 29, 2018

(51) Int. Cl.
| | |
|---|---|
| *H05K 7/14* | (2006.01) |
| *H02J 1/10* | (2006.01) |
| *B64D 45/00* | (2006.01) |
| *B64D 47/00* | (2006.01) |

(52) U.S. Cl.
CPC .......... *H05K 7/1432* (2013.01); *B64D 45/00* (2013.01); *B64D 47/00* (2013.01); *H02J 1/102* (2013.01); *B64D 2045/0085* (2013.01); *B64D 2221/00* (2013.01)

(58) Field of Classification Search
CPC .................................................. H05K 7/1432
See application file for complete search history.

(56) References Cited

U.S. PATENT DOCUMENTS

| | | | |
|---|---|---|---|
| 6,850,415 B2 | 2/2005 | Dimarco | |
| 7,307,851 B2 | 12/2007 | Dimarco | |
| 8,760,000 B2 | 6/2014 | Mubaslat | |
| 9,327,600 B1 | 5/2016 | Nehmeh | |
| 9,533,636 B2 | 1/2017 | Brouwer et al. | |
| 2016/0236770 A1 | 8/2016 | DeSantis et al. | |
| 2017/0185094 A1* | 6/2017 | Atkinson | G05F 1/59 |
| 2019/0291674 A1* | 9/2019 | Settles | B60R 21/0136 |

FOREIGN PATENT DOCUMENTS

| | | |
|---|---|---|
| EP | 3154151 A1 | 4/2017 |
| WO | WO 2013076952 A1 | 5/2013 |

OTHER PUBLICATIONS

Extended European Search Report for EP Application No. 18172824.7, dated Jul. 4, 2018, 7 pages.
Communication Pursuant to Article 94(3) EPC for EP Application No. 18172824.7, dated Sep. 20, 2019, pages 5.

* cited by examiner

*Primary Examiner* — Daniel J Cavallari
(74) *Attorney, Agent, or Firm* — Kinney & Lange, P.A.

(57) ABSTRACT

A power conditioning system includes a power source, at least one node, a host unit and a voltage regulator unit. The host unit includes a host mechanical housing and is configured to communicate with the at least one node. The voltage regulator unit includes a first regulator mechanical housing and a first voltage regulator circuit. The first regulator mechanical housing is mechanically mated with the host mechanical housing. The first voltage regulator circuit is configured to condition the power from the power source and provide first conditioned power to the at least one node.

18 Claims, 4 Drawing Sheets

REGULATOR UNIT FOR DISTRIBUTED SENSOR SYSTEMS

BACKGROUND

The present disclosure relates generally to power conditioning, and in particular to power regulation for aircraft flight-data acquisition systems.

Aircraft health monitoring and avionics systems are typically run on industry standard compliant power. This power may be noisy and subject to interrupts, making it incompatible with sensitive electronics, for example. In turn, aircraft systems often condition the aircraft power to remove noise and spikes, and provide hold-up power to prevent voltage interrupts from interfering with system operation. However, power conditioning circuits consume space and generate heat proportional to the level of power being conditioned.

Traditional aircraft health monitoring systems include a central host with many analog inputs. Power used by these systems is relatively consistent across applications, allowing for appropriate sizing of power conditioning circuitry. Future aircraft may utilize distributed digital systems, for example. In these distributed systems, digitization and processing may be performed at the periphery by "smart" sensors. These smart sensors can be daisy-chained together on a digital bus, allowing for one bus interface at a host to connect with one or many sensors. To keep the size of these smart sensors at a minimum, it is desirable to refrain from conditioning the aircraft power at the sensor, and rather obtain the conditioned power from the sensor bus. However, it may be difficult to design a system host that is capable of powering a large number of buses and/or smart sensors without being oversized for applications that include fewer sensors.

SUMMARY

A power conditioning system includes a power source, at least one node, a host unit and a voltage regulator unit. The host unit includes a host mechanical housing and is configured to communicate with the at least one node. The voltage regulator unit includes a first regulator mechanical housing and a first voltage regulator circuit. The first regulator mechanical housing is mechanically mated with the host mechanical housing. The first voltage regulator circuit is configured to condition the power from the power source and provide first conditioned power to the at least one node.

A method of conditioning power for at least one node in a system that includes a host unit having a host mechanical housing and a voltage regulator unit having a first regulator mechanical housing includes mechanically mating the first regulator mechanical housing and the host mechanical housing; receiving, by the voltage regulator unit, unconditioned power from a power source; conditioning, by a first regulator circuit of the voltage regulator unit, the unconditioned power to provide output power; communicating, by the host unit, with at least one node; and powering the at least one node with the output power.

DETAILED DESCRIPTION

A voltage regulator unit is disclosed herein that connects to a host unit to provide further power regulation for one or more nodes. The voltage regulator unit is mechanically connected to the host unit. The mechanical connection may facilitate electrical connection between the voltage regulator unit and the host unit, or a separate electrical connection may be used. The voltage regulator unit includes a voltage regulator circuit configured to provide power conditioning for the one or more nodes. The voltage regulator circuit may be configured to provide any desired power conditioning specific to the power needs of the one or more nodes. This way, if the power conditioning needs of the system change, the voltage regulator unit may be swapped out for a new voltage regulator unit, or additional voltage regulator units may be added to the system, rather than requiring the entire flight data acquisition unit to be changed.

Figure 1A:
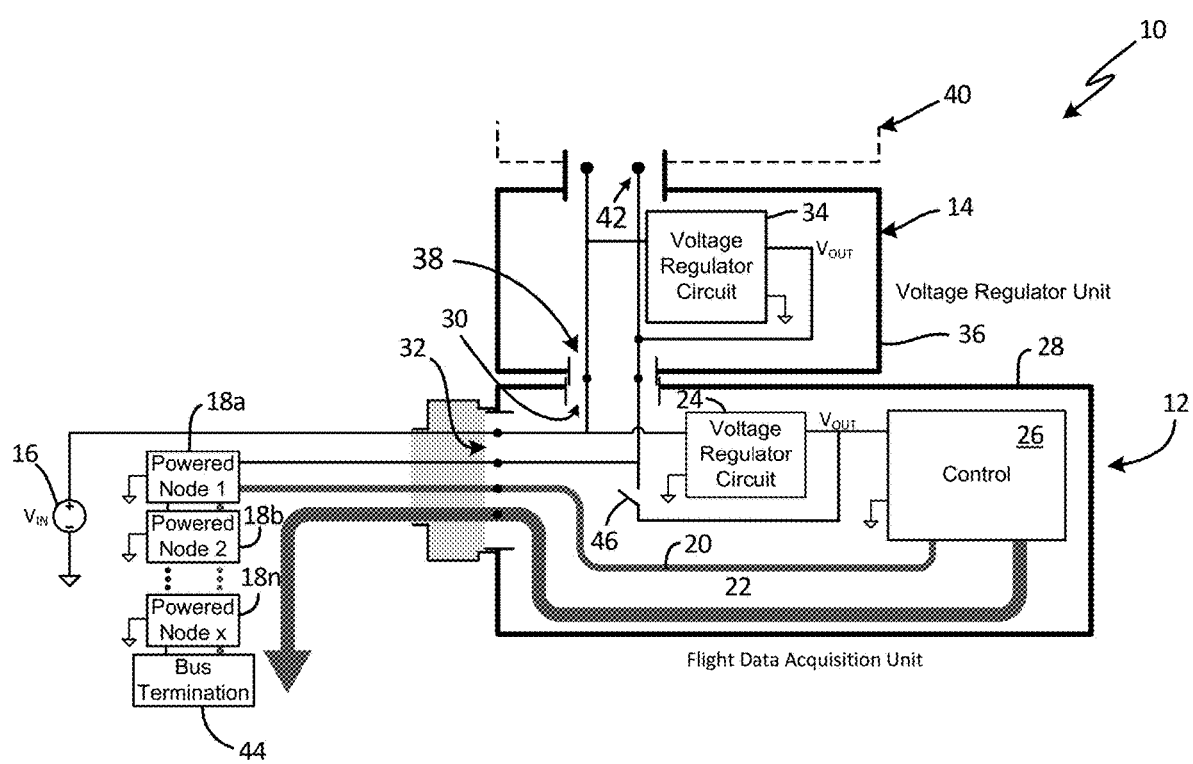
FIGS. 1A and 1B are block diagrams illustrating aircraft systems that include power regulation for a flight data acquisition system.

FIG. 1A is a block diagram illustrating aircraft system 10 that includes power regulation for a flight data acquisition system. System 10 includes flight data acquisition unit 12, voltage regulator unit 14, power source 16, nodes 18a-18n and communication buses 20 and 22. Flight data acquisition unit 12 includes voltage regulator circuit 24, control circuit 26, mechanical housing 28, input/output (IO) connectors 30 and 32, and switch 46. Voltage regulator unit 14 includes voltage regulator circuit 34, mechanical housing 36 and IO connector 38. Additional voltage regulator units 40 may be connected to voltage regulator unit 14 through optional IO connector 42, for example. While illustrated as an aircraft flight data acquisition system, acquisition unit 12 may be any air or ground-based host unit configured to power and communicate with remote nodes.

Power source 16 is any source of power such as aircraft power received from an aircraft power bus. For example, in military applications, power source 16 may provide MIL-STD-704 power, which is a United States Military Standard. This, and other aircraft power standards, are often incompatible with sensitive electronics, such as aircraft sensors. Thus, power regulation is utilized to condition the power from power source 16 prior to provision to nodes 18a-18n.

In prior art systems, flight data acquisition unit 12 was the sole source of power regulation for distributed analog nodes. As more digital "smart" sensors are implemented, the power needs of nodes 18a-18n, which may be analog sensors, digital sensors, or any other electronic node located remote of flight data acquisition unit 12, increase. Providing sufficient power regulation solely from flight data acquisition unit 12 may result in an oversized unit. Thus, voltage regulator unit 14 is configured to provide additional power regulation for flight data acquisition unit 12 in applications in which flight data acquisition unit 12 does not provide sufficient regulation.

Power from power source 16 is received by flight data acquisition unit 12 and conditioned by voltage regulator circuit 24. The conditioned power from voltage regulator circuit 24 is provided to power control circuit 26. Control circuit 26 may include, among other electronic circuitry, a processor, memory, signal conditioning circuit, and/or any other electronics required to fulfill the functionality requirements of flight data acquisition unit 12. The conditioned power from voltage regulator circuit 24 may also be provided to nodes 18a-18n through switch 46. While not illustrated in FIG. 1A, switch 46 may be controlled by control circuit 26 to selectively provide the conditioned power from voltage regulator 24 to nodes 18a-18n.

Control circuit 26 is connected to communicate on buses 20 and 22. Bus 20 may be a digital communication bus, for example, and may be configured to provide data communication between nodes 18a-18n and flight data acquisition unit 12. Bus 20 may be any digital communication bus, such as an RS-485 bus or other deterministic data bus. Bus 22 may be any aircraft data and/or power bus and may provide communication between flight data acquisition unit 12 and other aircraft systems, for example. While illustrated as two communication buses 20 and 22, any number of digital and/or analog buses may be connected for communication with flight data acquisition unit 12.

Power from power source 16 is also provided to voltage regulator unit 14 through flight data acquisition unit 12. IO connector 30 of flight data acquisition unit 12 mates electrically with IO connector 38 of voltage regulator unit 14. IO connectors 32 and 38 are any type electrical connectors, for example, that allow the mechanical connection of voltage regulator unit 14 with flight data acquisition unit 12 to facilitate the electrical connection between IO connectors 32 and 38. The mechanical connection between voltage regulator unit 14 and flight data acquisition unit 12 may be accomplished using any desired mechanical connection. For example, any of the mechanical connections between voltage regulator unit 14 and flight data acquisition unit 12 illustrated in FIGS. 1B and 3A-3C may be utilized to mechanically bond voltage regulator unit 14 and flight data acquisition unit 12.

Figure 2:
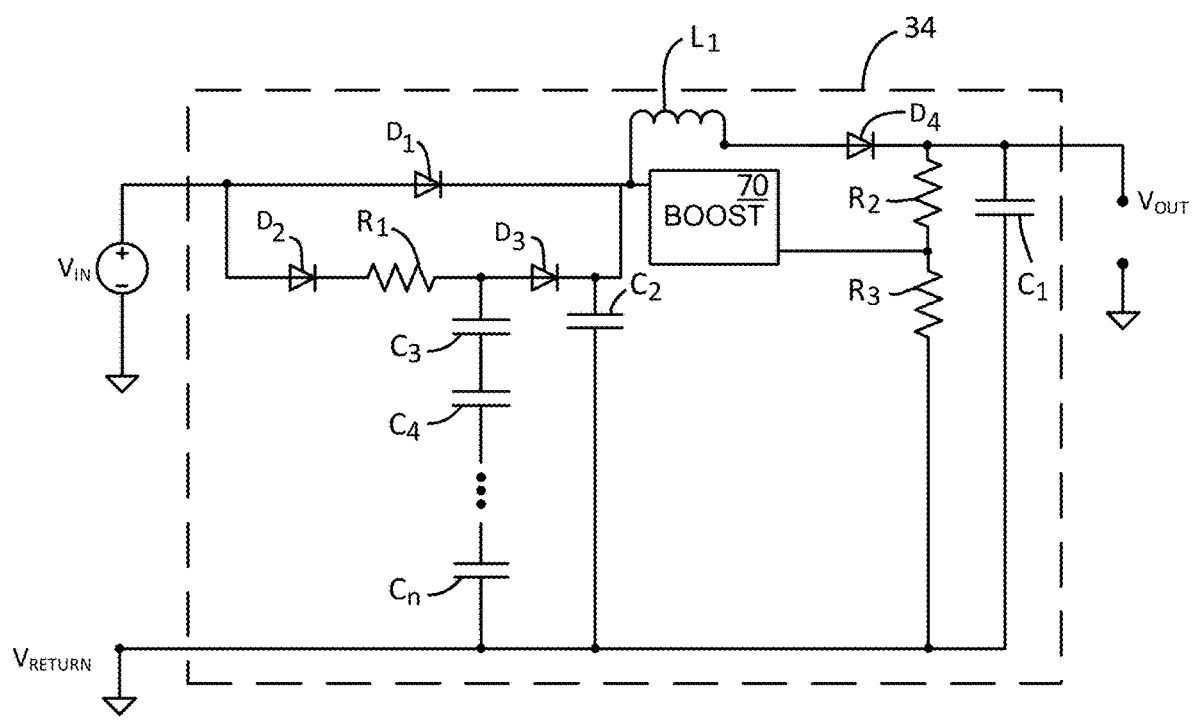
FIG. 2 is a circuit diagram illustrating a voltage regulator circuit.

Voltage regulator circuit 34 may be configured to provide power conditioning for nodes 18a-18n. Voltage regulator circuit 34 may be similar to, or substantially different from, voltage regulator circuit 24. An example embodiment of voltage regulator circuit 34 is shown in FIG. 2. In the embodiment illustrated in FIG. 1A, power is routed from power source 16, through flight data acquisition unit 12, to voltage regulator unit 14. The conditioned power from voltage regulator circuit 34 is routed through flight data acquisition unit 12, through IO connector 32, to nodes 18a-18n.

System 10 may include any number of voltage regulator units 14 to satisfy the power needs of nodes 18a-18n. Illustrated in FIG. 1A is an optional second voltage regulator unit 40. Voltage regulator unit 40 may mate electrically with voltage regulator unit 14 through IO connector 42. Power is provided to voltage regulator unit 40 through voltage regulator unit 14, for example, and conditioned power may be returned from voltage regulator unit 40 through voltage regulator unit 14.

Nodes 18a-18n are powered by the conditioned power from voltage regulator unit 14 and provide data communication to flight data acquisition unit 12 on bus 20. In the embodiment shown in FIG. 1A, nodes 18a-18n are all connected to receive power from the same power connection and are all connected to provide data on the common communication bus 20. Bus termination 44 is utilized to terminate the power bus and communication bus 20, for example. Bus termination 44 may be any component(s), such as a termination resistor, configured to provide electrical termination for the power bus and communication bus 20. While not illustrated in FIG. 1A, buses 20 and 22 may also be passed to voltage regulator unit 14 through connectors 30 and 38.

Figure 1B:
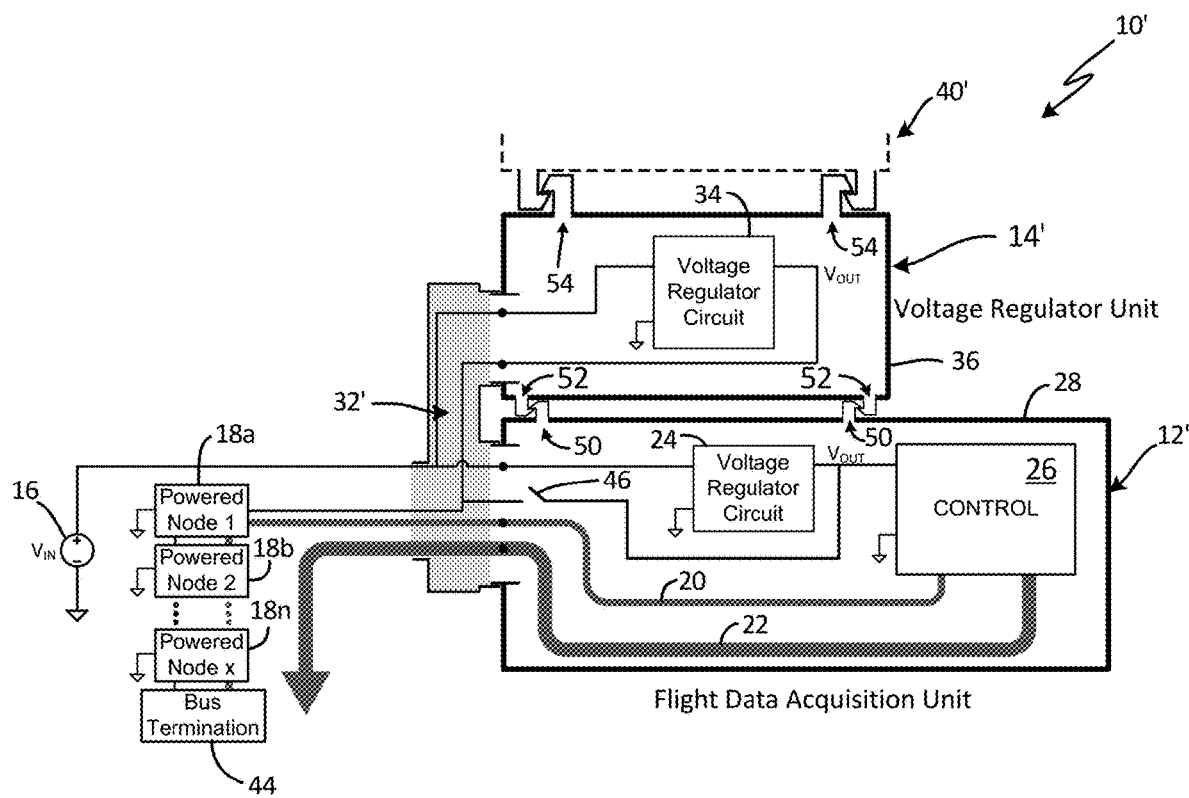

FIG. 1B is a block diagram illustrating aircraft system 10' that includes power regulation for flight data acquisition system. Components with the same reference number between system 10' and system 10 (FIG. 1A) have substantially similar functionality. System 10' includes flight data acquisition unit 12' and voltage regulator unit 14'. Flight data acquisition unit 12' includes mechanical connector 50 and voltage regulator unit 14' includes mechanical connector 52 and mechanical connector 54. In the embodiment illustrated in FIG. 1B, the mechanical connection between voltage regulator unit 14 and flight data acquisition unit 12 does not facilitate electrical connection between the units.

Voltage regulator unit 14' mechanically bonds with flight data acquisition unit 12' through mechanical connectors 50 and 52. Likewise, any additional voltage regulator units 40' mechanically bond with the previous voltage regulator unit 14' using mechanical connector 54. While illustrated as a mechanical snap connection, voltage regulator unit 14' may be mechanically connected to flight data acquisition unit 12' through any type of mechanical connection, such as those illustrated in FIGS. 3A-3C. In the embodiment illustrated in FIG. 1B, power is provided directly to voltage regulator unit 14' through IO connector 32', rather than through flight data acquisition unit 12'. While not shown in FIG. 1B, IO connector 32' may extend to accommodate additional voltage regulator units 40'. Also, while not shown in FIG. 1B, buses 20 and 22 may also be passed to voltage regulator unit 14' through connector 32'.

Conditioned power is provided for nodes 18a-18n from voltage regulator unit 14'. The output of voltage regulator circuit 34 is provided as an output through IO connector 32'. Nodes 18a-18n may receive the conditioned power from voltage regulator circuit 34 through IO connector 32'. Additional voltage regulation may be selectively provided to nodes 18a-18n from voltage regulator circuit 24 through switch 46.

FIG. 2 is a circuit diagram illustrating an embodiment of voltage regulator circuit 34. Voltage regulator circuit 34 includes diodes D1-D4, Capacitors C1-Cn, inductor L1, boost circuit 70 and resistors R1-R3.

Diodes D1-D3, resistor R1 and Capacitors C3-Cn form a hold-up power circuit for voltage regulator circuit 34. For example, input power from power source 16 is received and utilized to charge capacitors C3-Cn, which provides hold-up power for boost circuit 70. Boost circuit 70, inductor L1, diode D4, resistors R2 and R3 and capacitor C1 condition the hold-up power. The conditioned power is then provided as $V_{OUT}$ for nodes 18a-18n.

While FIG. 2 illustrates an example embodiment, voltage regulator circuit 34 may include any configuration to provide power conditioning for nodes 18a-18n. For example, voltage regulator circuit 34 may include a buck circuit in place of, or in addition to, boost circuit 70, may include additionally filter circuitry or any other circuitry to meet the power needs of nodes 18a-18n based upon the input power provide from power source 16.

Figure 3A:
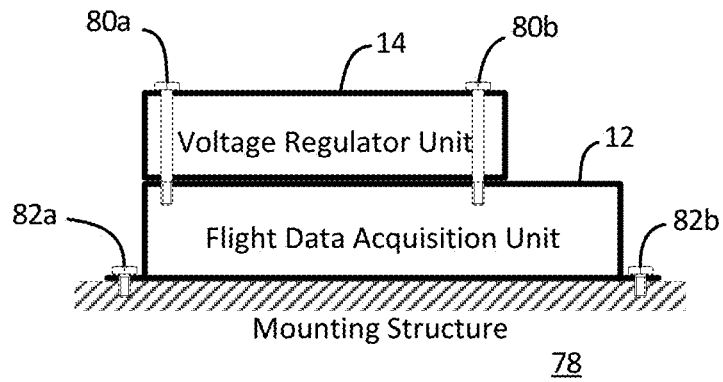
FIGS. 3A-3C are diagrams illustrating embodiments of mechanical connections between a voltage regulator unit and a flight data acquisition unit.
Figure 3B:
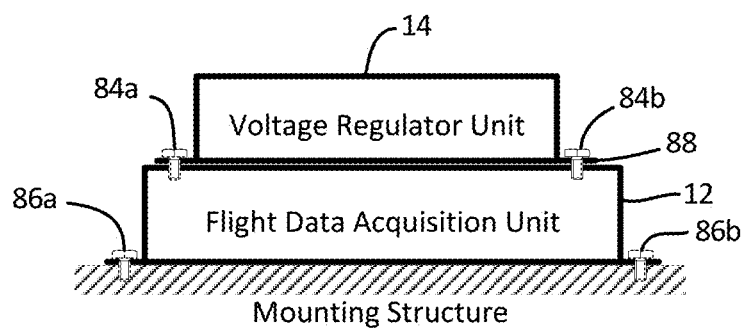
Figure 3C:
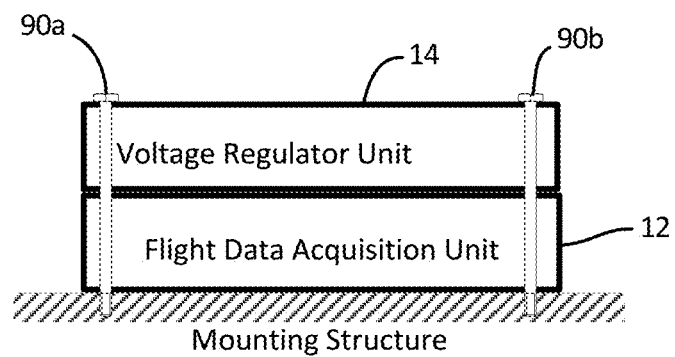

FIGS. 3A-3C are diagrams illustrating further embodiments of mechanical connections between voltage regulator 14 and flight data acquisition unit 12. In FIG. 3A, flight data acquisition unit 12 is connected to mounting structure 78 using fasteners 82a and 82b. Voltage regulator unit 14 is mounted to flight data acquisition unit 12 using fasteners 80a and 80b. While illustrated as two fasteners 80a and 80b, any number of fasteners may be utilized to connect voltage regulator unit 14 to flight data acquisition unit 12. Likewise, while illustrated as two fasteners 82a and 82b, any number of fasteners may be utilized to mount flight data acquisition unit 12 to mounting structure 78. As illustrated in FIG. 3A, fasteners 80a and 80b pass fully through voltage regulator unit 14. Thus, voltage regulator unit 14 may include mounting holes that align with respective mounting holes in the housing of flight data acquisition unit 12.

In the embodiment illustrated in FIG. 3B, flight data acquisition unit 12 is connected to mounting structure 78 using fasteners 86a and 86b. Voltage regulator unit 14 is mounted to flight data acquisition unit 12 using fasteners 84a and 84b. While illustrated as two fasteners 84a and 84b, any number of fasteners may be utilized to connect voltage regulator unit 14 to flight data acquisition unit 12. Likewise, while illustrated as two fasteners 86a and 86b, any number of fasteners may be utilized to mount flight data acquisition unit 12 to mounting structure 78. As illustrated in FIG. 3B, fasteners 84a and 84b are used to mount voltage regulator unit 14 to flight data acquisition unit 12 through flanges 88. Flanges 88 may include mounting holes that align with mounting holes in the housing of flight data acquisition unit 12.

In the embodiment illustrated in FIG. 3C, flight data acquisition unit 12 and voltage regulator unit 14 are both connected to mounting structure 78 using fasteners 90a and 90b. While illustrated as two fasteners 90a and 90b, any number of fasteners may be utilized to connect voltage regulator unit 14 and flight data acquisition unit 12 to mounting structure 78. As illustrated in FIG. 3C, fasteners 90a and 90b pass fully through both voltage regulator unit 14 and flight data acquisition unit 12. Thus, voltage regulator unit 14 and flight data acquisition unit 12 may both include mounting holes that align to receive a single fastener between.

Discussion of Possible Embodiments

The following are non-exclusive descriptions of possible embodiments of the present invention.

A power conditioning system includes a power source, at least one node, a host unit and a voltage regulator unit. The host unit includes a host mechanical housing and is configured to communicate with the at least one node. The voltage regulator unit includes a first regulator mechanical housing and a first voltage regulator circuit. The first regulator mechanical housing is mechanically mated with the host mechanical housing. The first voltage regulator circuit is configured to condition the power from the power source and provide first conditioned power to the at least one node.

The system of the preceding paragraph can optionally include, additionally and/or alternatively, any one or more of the following features, configurations and/or additional components:

A further embodiment of the foregoing system, wherein the host unit further includes a control circuit; and a second voltage regulator circuit configured to condition the power from the power source and provide second conditioned power to the control circuit.

A further embodiment of any of the foregoing systems, wherein the control circuit is configured to communicate with the at least one node over a digital communication bus.

A further embodiment of any of the foregoing systems, wherein the first regulator mechanical housing is mechanically mated with the host mechanical housing through a mechanical connection that facilitates an electrical connection between the host unit and the voltage regulator unit, and wherein the power is received by the host unit through the electrical connection and is routed to the voltage regulator unit through the host mechanical housing.

A further embodiment of any of the foregoing systems, further comprising an electrical connector, wherein the host unit and the voltage regulator unit receive the power through the electrical connector.

A further embodiment of any of the foregoing systems, further comprising a second regulator unit that includes a second regulator mechanical housing configured to mechanically mate with the first regulator mechanical housing.

A further embodiment of any of the foregoing systems, wherein the host unit is an aircraft flight data acquisition unit and the at least one node is a digital sensor.

A further embodiment of any of the foregoing systems, wherein the power source is an aircraft power bus.

A further embodiment of any of the foregoing systems, wherein the first regulator mechanical housing is mechanically mated with the host mechanical housing such that the voltage regulator unit and the host regulator unit are mounted to a mounting structure using at least one common fastener that passes through both the first regulator mechanical housing and the host mechanical housing.

A method of conditioning power for at least one node in a system that includes a host unit having a host mechanical housing and a voltage regulator unit having a first regulator mechanical housing includes mechanically mating the first regulator mechanical housing and the host mechanical housing; receiving, by the voltage regulator unit, unconditioned power from a power source; conditioning, by a first regulator circuit of the voltage regulator unit, the unconditioned power to provide output power; communicating, by the host unit, with at least one node; and powering the at least one node with the output power.

The method of the preceding paragraph can optionally include, additionally and/or alternatively, any one or more of the following features, configurations and/or additional components:

A further embodiment of the foregoing method, further including receiving, by the host unit, the unconditioned power from the power source; conditioning, by a second regulator circuit of the host unit, the unconditioned power into host conditioned power; and powering a control circuit of the host unit using the host conditioned power.

A further embodiment of any of the foregoing methods, wherein communicating, by the host unit, with the at least one node includes communicating, via a digital communication bus, between the host unit and the at least one node.

A further embodiment of any of the foregoing methods, wherein receiving, by the voltage regulator unit, the unconditioned power from a power source includes receiving the unconditioned power through the host unit and through an electrical connection facilitated by the mechanical mating.

A further embodiment of any of the foregoing methods, wherein receiving, by the voltage regulator unit, the unconditioned power from the power source includes receiving the unconditioned power through an electrical connector configured to connect to the regulator mechanical housing.

A further embodiment of any of the foregoing methods, further including mechanically mating a second regulator mechanical housing of a second regulator unit with the first regulator mechanical housing; receiving, by the second regulator unit, the unconditioned power; and conditioning, by the second regulator unit, the unconditioned power.

A further embodiment of any of the foregoing methods, wherein the host unit is an aircraft flight data acquisition unit and the at least one node is a digital sensor.

A further embodiment of any of the foregoing methods, wherein the power source is an aircraft power bus.

A further embodiment of any of the foregoing methods, wherein mechanically mating the first regulator mechanical housing and the host mechanical housing includes mounting the voltage regulator unit and the host regulator unit to a mounting structure using at least one common fastener that passes through both the first regulator mechanical housing and the host mechanical housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A power conditioning system comprising:
   a power source;
   at least one node;
   a host unit that includes a host mechanical housing and is configured to communicate with the at least one node; and
   a voltage regulator unit comprising:
      a first regulator mechanical housing mechanically mated with the host mechanical housing; and
      a first voltage regulator circuit configured to condition the power from the power source and provide first conditioned power to the at least one node.

2. The system of claim 1, wherein the host unit further comprises:
   a control circuit; and
   a second voltage regulator circuit configured to condition the power from the power source and provide second conditioned power to the control circuit.

3. The system of claim 2, wherein the control circuit is configured to communicate with the at least one node over a digital communication bus.

4. The system of claim 1, wherein the first regulator mechanical housing is mechanically mated with the host mechanical housing through a mechanical connection that facilitates an electrical connection between the host unit and the voltage regulator unit, and wherein the power is received by the host unit through the electrical connection and is routed to the voltage regulator unit through the host mechanical housing.

5. The system of claim 1, further comprising an electrical connector, wherein the host unit and the voltage regulator unit receive the power through the electrical connector.

6. The system of claim 1, further comprising a second regulator unit that includes a second regulator mechanical housing configured to mechanically mate with the first regulator mechanical housing.

7. The system of claim 1, wherein the host unit is an aircraft flight data acquisition unit and the at least one node is a digital sensor.

8. The system of claim 7, wherein the power source is an aircraft power bus.

9. The system of claim 1, wherein the first regulator mechanical housing is mechanically mated with the host mechanical housing such that the voltage regulator unit and the host regulator unit are mounted to a mounting structure using at least one common fastener that passes through both the first regulator mechanical housing and the host mechanical housing.

10. A method of conditioning power for at least one node in a system that includes a host unit having a host mechanical housing and a voltage regulator unit having a first regulator mechanical housing, the method comprising:
   mechanically mating the first regulator mechanical housing and the host mechanical housing;
   receiving, by the voltage regulator unit, unconditioned power from a power source;
   conditioning, by a first regulator circuit of the voltage regulator unit, the unconditioned power to provide output power;
   communicating, by the host unit, with at least one node; and
   powering the at least one node with the output power.

11. The method of claim 10, further comprising:
   receiving, by the host unit, the unconditioned power from the power source;
   conditioning, by a second regulator circuit of the host unit, the unconditioned power into host conditioned power; and
   powering a control circuit of the host unit using the host conditioned power.

12. The method of claim 11, wherein communicating, by the host unit, with the at least one node comprises communicating, via a digital communication bus, between the host unit and the at least one node.

13. The method of claim 11, wherein receiving, by the voltage regulator unit, the unconditioned power from a power source comprises receiving the unconditioned power through the host unit and through an electrical connection facilitated by the mechanical mating.

14. The method of claim 11, wherein receiving, by the voltage regulator unit, the unconditioned power from the power source comprises receiving the unconditioned power through an electrical connector configured to connect to the regulator mechanical housing.

15. The method of claim 10, further comprising:
   mechanically mating a second regulator mechanical housing of a second regulator unit with the first regulator mechanical housing;
   receiving, by the second regulator unit, the unconditioned power; and
   conditioning, by the second regulator unit, the unconditioned power.

16. The method of claim 10, wherein the host unit is an aircraft flight data acquisition unit and the at least one node is a digital sensor.

17. The method of claim 16, wherein the power source is an aircraft power bus.

18. The method of claim 10, wherein mechanically mating the first regulator mechanical housing and the host mechanical housing comprises mounting the voltage regulator unit and the host regulator unit to a mounting structure using at least one common fastener that passes through both the first regulator mechanical housing and the host mechanical housing.

* * * * *